June 3, 1969     D. LEJEUNE     3,447,571

HOSE FOR PUMPING SLURRIES

Filed May 31, 1967

INVENTOR
DANIEL LEJEUNE
BY

HIS ATTORNEYS

United States Patent Office 3,447,571
Patented June 3, 1969

3,447,571
HOSE FOR PUMPING SLURRIES
Daniel Lejeune, Clermont-Ferrand, France, assignor to Compagnie Generale des Etablissements Michelin, raison sociale Michelin & Cie, Clermont-Ferrand, France
Filed May 31, 1967, Ser. No. 642,446
Claims priority, application France, June 6, 1966, 64,754; Oct. 28, 1966, 82,100
Int. Cl. F16l *11/12, 11/04*
U.S. Cl. 138—138       8 Claims

ABSTRACT OF THE DISCLOSURE

This product is a tube or hose for pumping abrasive materials such as concrete slurries by progressive squeezing of the tube or hose along its length and is characterized by two or more reinforcing layers of bias-laid elastic metallic cables, an outer covering layer of an elastomer such as abrasion resistant rubber and an inner liner of abrasion resistant elastomer, such as rubber, with or without a filling of metallic filaments extending lengthwise of the hose or tubing, the thickness of the inner liner being as great as possible commensurate with the internal and external dimensions required in the tubing or hose and optimally twice or more as thick as the thickness of the layers of metallic cables.

This invention relates to improvements in resilient tubes, hoses or conduits having increased resistance to abrasion and to fatigue when crushed, and more particularly to reinforced resilient tubes used for pumping abrasive material, such as, for example, concrete slurries.

For delivering concrete slurries from a cement mixer to the work site, pumps have been used which operate by squeezing or contracting a resilient tube such as a reinforced rubber tube or base progressively along its length, thereby causing a flow of the slurry through the tube. In practice, the tube is bent into a loop with one of its ends connected to a concrete mixer and the other end to a feed line. Rollers traveling in planetary or arcuate paths press the tube against a fixed wall while rolling along the loop of the tube, thereby producing the progressive squeezing and expansion referred to above. Pumps of the type mentioned require tubes which are resistant to the fatigue caused by repeated compression or squeezing and internal abrasion, especially if the tube is filled with an abrasive material, such as concrete, containing pebbles, sand or other particles having relatively sharp edges.

The tubes currently available have a relatively short operating life in spite of the usual provision of thick walls and a braided polyamide or other type of elastic and durable fabric reinforcement.

The present invention relates to improvements in tubes of the type referred to above, including reinforcements which impart greatly improved resistance to abrasion and repeated compression and expansion.

More particularly, improved pump tubes embodying the present invention are reinforced by means of a plurality of plies or layers of elastic metallic cables inclined on a bias in two different directions relative to the length of the tube and including a liner of abrasion resistant elastomer such as tire tread rubber having a thickness at least equalling the thickness of the elastic metal cable plies. In addition, the liner may include one or more layers of an elastomer filled with metallic fibers.

The metal cables in the reinforcing plies must have substantial extensibility or elasticity, for example, an elongation at rupture of above 6%. Such elastic metal cables as those described in U.S. Patent No. 3,090,189 are particularly suitable for reinforcing the hoses. In practice, only two plies of metallic cables usually are required for reinforcing purposes and the cables in each ply are disposed in substantially parallel relation and inclined to the length or axis of the tube at an angle between 45 to 65° with the cables of the plies crossing each other. By utilizing elastic metallic cables in the tube, the thickness of the rubber in which the plies are embedded and which covers the outer most ply can be substantially reduced, thereby improving the resiliency of the tube and its resistance to crushing and abrasion.

Surprisingly, it has been found that the life span of the reinforcing cables in the tube increases more than proportionately as the thickness of the inner lining of the tube is increased. Accordingly, the thickness of the lining should be made as great as is compatible with the fixed outer and inner diameters of the tube.

As a further reinforcement of the tube, the liner may be provided with one or more layers of fine metallic filaments embedded in elastomer, the filaments extending generally lengthwise of the tube and constituting about 50 to 70% of the weight of the layer. Suitable filaments are brass plated steel filaments having a diameter of about 0.1 to 0.3 mm. and a length of between about 10 to 30 mm. By extending the filaments lengthwise of the hose, the resistance of the tube to compression is not materially increased while at the same time the filaments afford maximum resistance to penetration by any cutting or perforating solid bodies being pumped through the tube. The thickness of the layer of filaments preferably should not exceed about 2 mm. so as to maintain the desired and necessary resiliency of the tube. If more than one layer of the filaments is included in the tube, they should be separated from one another by a layer of elastic rubber which is not loaded with metallic fibers and has a thickness of at least 1 mm.

For a better understanding of the present invention, reference may be had to the accompanying drawing, in which.

Figure 1:
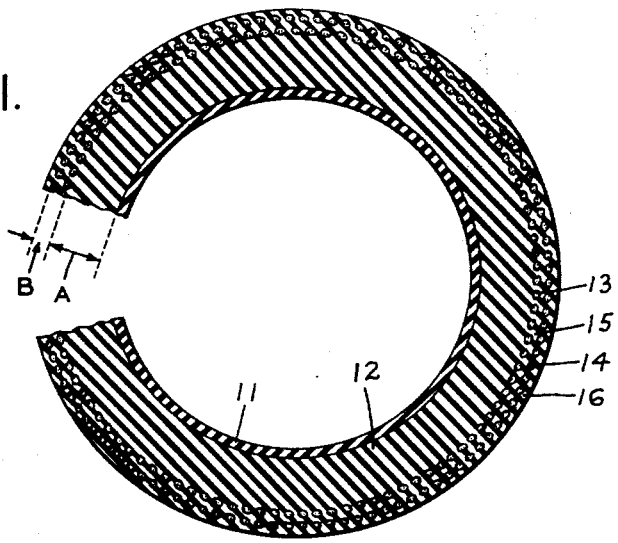
FIGURE 1 is a view in cross-section and partially broken away of an elastic tube embodying the present invention.

Referring to FIGURE 1, a typical tube embodying the invention is 105 mm. in diameter and contains from the inside out an abrasion resistant rubber layer 11, a lining 12, 9 mm. thick made of elastomer which is highly resistant to abrasion and tearing surrounded by two plies 13 and 14 of elastic metal cables between which is placed a layer of a more elastic elastomer 15 and the outermost ply of metallic cable being covered by an outer layer 16 of a wear resistant rubber which is at least 1 mm. thick. In the example given, the thickness A of the liner 12 is approximately three times the thickness B of the reinforcement consisting of the two plies of cables 13 and 14 and the intermediate layer 15.

Figure 2:
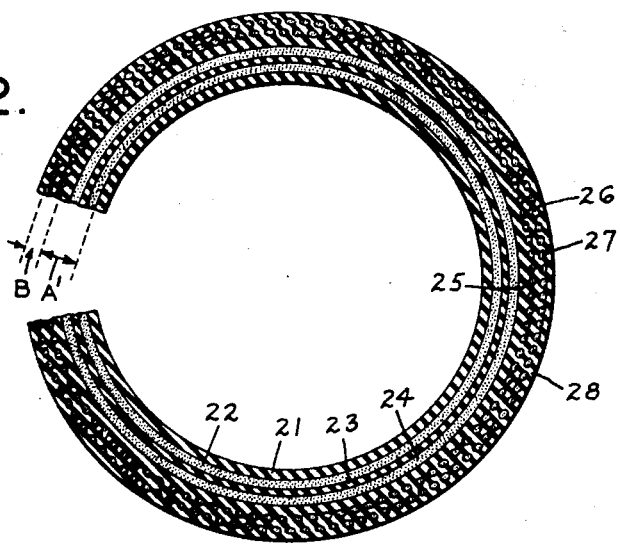
FIGURE 2 is a cross-sectional view partially broken away of a modified form of a tube embodying the present invention.

The embodiment of the invention disclosed in FIGURE 2 differs from that shown in FIGURE 1 in that it includes layers of elastomer in which are embedded fine metallic filaments to be described hereinafter. From the inside out, the tube consists of a wear resistant rubber layer 21, a lining containing a layer 22 of an elastomer loaded with metallic filaments, a layer 23 of an elastic elastomer devoid of metallic filaments, a layer 24 of an elastomer loaded with metallic filaments, a layer 25 of an elastic elastomer devoid of metal filaments, two plies 26 and 27 of elastic metallic cables embedded in an elastomer, and an outside covering 28 consisting of an elastomer resistant to abrasion. The thickness A' of the lining is about four times the total thickness B of the two plies of cables 26 and 27.

Figure 3:
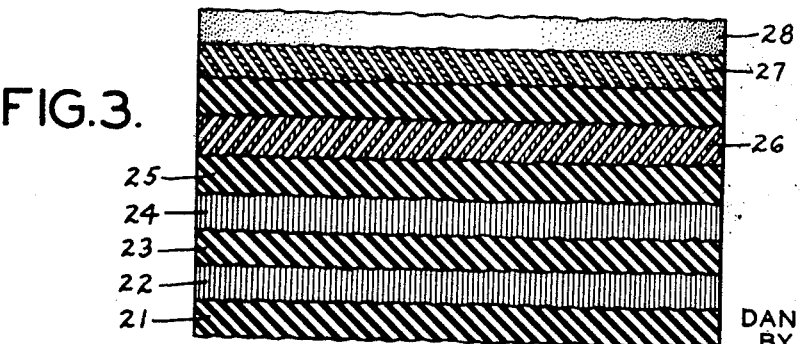
FIGURE 3 is a partial sectional plan view of the tube illustrating the arrangement of the various layers therein.

The metallic cables in both of the embodiments of the invention described above consist of three twisted strands of seven filaments each of 0.15 mm. diameter. This cable under a load of 5 kg. elongates approximately 1.8% and at rupture is elongated 6.2%. In each of the embodiments of the hose, the cables are placed at an angle of approximately 54° with respect to the axis of the tube and are wound or directed in opposite directions, as shown in FIGURE 3.

As indicated above, the elastomer used in the lining and the cover of the tube should be an abrasion resistant material which is also highly resistant to tearing. Rubber of the type used in the treads of pneumatic tires has been found suitable for this purpose. By way of typical example, the composition of the lining 11, 12 and covering 16 of FIGURE 1 and the composition of the lining including the layer 21, the elastomer in the layers 22 and 23, the layer 25 and the covering 28 may be as follows:

Passenger car tread

| | Parts by weight |
|---|---|
| High modulus crepe | 100 |
| A petroleum base plasticizer and modifier, such as oil soluble sulphonic acid | 1 |
| Stearic acid | 3 |
| Zinc oxide | 3 |
| An antioxidant, such as polymerized trimethyl dihydroquinoline | 1 |
| An antioxidant, such as phenyl-β-naphthylamine and diphenyl-p-phenylenediamine | 1 |
| Channel black | 40 |
| Reinforcing black | 10 |
| Para flux | 3 |
| Sulfur | 2.5 |
| A thiazole accelerator, such as N-oxydiethylene benzothiazole 2-sulfenamide | 0.9 |
| A thiazole accelerator, such as benzothiazyl disulfide | 0.15 |

After vulcanization, the above composition provides the necessary resistance to abrasion and tearing without at the same time reducing the resiliency of the tube undesirably.

The more elastic layers in the tubing may be composed of an elastomer which has less resistance to abrasion and tearing and greater elasticity than the tire tread rubber. An example of a suitable elastomer for the layers 15 and 23, for example, is as follows:

| | Parts by weight |
|---|---|
| High modulus crepe | 100 |
| A petroleum base plasticizer and modifier, such as oil soluble sulphonic acid | 1 |
| Stearic acid | 3 |
| Zinc oxide | 3 |
| An antioxidant, such as a blend of about 65% phenyl-β-naphthylamine and 35% diphenyl-p-phenylenediamine | 1 |
| An antioxidant, such as a mixture of octylated diphenylamines | 1 |
| Para flux | 3 |
| Channel black | 35 |
| Carbon black | 10 |
| Sulfur | 2.8 |
| A thiazole accelerator, such as N-oxydiethylene benzothiazole 2-sulfenamide | 0.75 |
| A thiazole accelerator, such as benzothiazyl disulfide | 0.25 |

This type of elastomer is similar to that used in the sidewalls or carcasses of tires and after vulcanization has the necessary resistance to shearing and flexing stresses to avoid separation of the filament filled layers and the cable containing layers from the tube when subjected to repeated compression and expansion occurring in pumps of the type mentioned.

It will be understood that the size, that is, the external and internal diameters of the tubes, can be varied as the purpose demands, and more than two layers of cable containing plies and more or fewer than two layers of filaments may be included in the tubes, and that the compositions of the elastomers in which these plies are embedded and making up the major portion of the tube also are susceptible to variation so long as they have the physical properties described above. Accordingly, the examples of the invention given herein should be considered as illustrative and the invention should be considered as limited only as defined in the following claims.

I claim:

1. A hose for pumping slurries by progressive compression and expansion of the hose along its length comprising a tubular lining layer of an abrasion and tear resistant elastomer, at least two layers of elastic metal cables embedded in elastomer bonded to and disposed around said lining, said cables in each layer being substantially parallel and inclined at an angle between about 45° and 65° to the axis of said lining layer and each cable of each layer extending at an angle to each cable of the other layer and an outer cover layer of abrasion resistant elastomer, the thickness of said lining layer being at least equal to the combined thicknesses of said layers of elastic cables.

2. The hose set forth in claim 1 in which said elastic metallic cables have an extension at rupture of at least 6%.

3. The hose set forth in claim 2 in which the thickness of said lining layer is at least twice the combined thickness of said layers of elastic metal cables.

4. The hose set forth in claim 2 in which the elastomer of said lining layer is tire tread rubber.

5. The hose set forth in claim 1 comprising at least one layer of elastomer containing metallic filaments about 0.1 to 0.3 mm. diameter in said lining layer.

6. The hose set forth in claim 5 in which said filaments are about 10 to 30 mm. long and extend substantially lengthwise of the tubular lining layer, the thickness of each layer of elastomer containing said filaments not exceeding about 2 mm.

7. The hose set forth in claim 5 in which said filaments are about 10 to 30 mm. long and extend substantially lengthwise of the tubular lining layer, the thickness of each layer containing said filaments not exceeding about 2 mm. and the filaments contained in each layer being in the proportion of about 50 to 70% of the weight of the elastomer and filaments in each layer.

8. The hose set forth in claim 5 in which said elastic metallic cables have an extension at rupture of at least 6% and said filaments are about 10 to 30 mm. long and extend substantially lengthwise of the tubular lining layer, the thickness of each layer containing said filaments not exceeding about 2 mm. and the filaments contained in each layer being in the proportion of about 50 to 70% of the weight of the elastomer and filaments in each layer.

References Cited

UNITED STATES PATENTS

| 2,991,808 | 7/1961 | Siegmann et al. | 138—137 |
| 3,039,906 | 6/1962 | Baldwin et al. | 138—137 |
| 3,112,772 | 12/1963 | Connor et al. | 138—138 |
| 3,374,806 | 3/1968 | Skinner | 138—119 |

HENRY S. JAUDON, *Primary Examiner.*